United States Patent [19]

Quiring et al.

[11] 3,923,743

[45] Dec. 2, 1975

[54] PROCESS FOR CROSS-LINKABLE PULVERULENT COATING COMPOSITIONS BASED ON URETDIONE POLYISOCYANATES

[75] Inventors: Bernd Quiring, Leverkusen; Kuno Wagner, Leverkusen-Steinbuechel; Richard Müller, Bergisch-Neukirchen; Peter Müller, Schildgen, all of Germany

[73] Assignee: Bayer Aktiengesellschaft, Leverkusen Bayerwerk, Germany

[22] Filed: Feb. 28, 1974

[21] Appl. No.: 446,857

[30] Foreign Application Priority Data

Mar. 13, 1973 Germany............................ 2312391

[52] U.S. Cl. .................. 260/75 NT; 117/17; 117/21; 260/75 NE; 260/75 NK; 260/75 NP
[51] Int. Cl.² ...................... C08G 18/06; B05B 5/02
[58] Field of Search...... 260/75 NH, 75 NE, 75 NT, 260/75 NP, 77.5 AT, 77.5 AA

[56] References Cited
UNITED STATES PATENTS

| | | | |
|---|---|---|---|
| 3,248,370 | 4/1966 | Reischl et al................ | 260/77.5 AT |
| 3,655,627 | 4/1972 | Hutzler et al............... | 260/77.5 AA |
| 3,659,003 | 4/1972 | Johnson et al.............. | 260/77.5 AA |

OTHER PUBLICATIONS

DAS 1,153,900, Reischl et al., Sept. 5, 1963.

*Primary Examiner*—H. S. Cockeram
*Attorney, Agent, or Firm*—Lawrence S. Pope

[57] ABSTRACT

A pulverulent coating composition adapted to be applied to a substrate by spraying as a powder is prepared by a process which comprises reacting an organic polyisocyanate containing a uretdione group with an organic compound containing groups which contain reactive hydrogen atoms determinable by the Zerewitinoff method wherein the functionality of the reactants and the proportions thereof are chosen to provide an average functionality between about 2.05 and 10, the ratio of reactive hydrogen groups to —NCO groups is between about 1.07 to 1 and about 2.5 to 1 and the amount of polyisocyanate containing uretdione groups is sufficient to provide from about 0.6 percent to about 25 percent by weight uretdione groups.

5 Claims, No Drawings

PROCESS FOR CROSS-LINKABLE PULVERULENT COATING COMPOSITIONS BASED ON URETDIONE POLYISOCYANATES

This invention relates generally to polyisocyanate addition products and more particularly to a special process for producing polyisocyanate polyaddition products which are suitable for use as binders for powder lacquers which can be hardened at temperatures above 110°C. These polyisocyanate polyaddition products can be used alone to produce a cross-linkable pulverulent coating composition since they are self-crosslinking on heating. These products can also be used as the binder in a powder lacquer formulation which may also contain conventional lacquer components such as titanium dioxide. The total formulation can then be processed to produce a pulverulent cross-linkable coating composition.

The process of coating metal articles with coating materials in powder form is already known. The powders are applied to the metal and are then melted to form a protective coating on the metal. The various polymers used may be used either as single-component systems which are not capable of cross-linking or as single-component systems which undergo cross-linking without the aid of cross-linking agents.

Two-component and multi-component systems and their use as lacquer raw materials, e.g. mixtures of blocked polyisocyanates with polyesters which contain hydroxyl groups, etc. also belong to the state of the art (German Patent Specification No. 946,143). These compounds have the advantage over products which contain free isocyanate groups that they remain practically unchanged at low temperatures, e.g. at room temperature, even if they are stored for a considerable length of time in the presence of water and polyalcohols, and release the blocking agents only at elevated temperatures, generally above 100°C, to react with the polyfunctional reactants present, e.g. polyols, to form a cross-linked coating film.

These blocked isocyanates have the disadvantage that the blocking agent is liberated during the hardening reaction and released into the environment. Some of these blocking agents are not physiologically harmless (phenols, mercaptans) and moreover become deposited on the cooler parts of large stoving apparatus so that considerable effort is then required to clean the apparatus.

Polyaddition products which contain uretdione groups as described in U.S. Pat. No. 3,248,370, German Auslegeschrift No. 1,153,900, and U.S. application Ser. No. 350,676 are also unsuitable for use as binders for thermosetting lacquer powders because none of them fulfill all of the fundamental requirements for such binders, which include for example, a. the ability to be converted into powders at temperatures below 50°C,
b. having a softening or melting point between about 50°C and about 180°C, preferably between about 60°C and about 140°C and
c. having a hardening temperature at least 10°C to 40°C above the softening or melting point, preferably above 110°C and particularly between 140°C and 220°C.

It is therefore an object of this invention to provide a process for making a binder for a powder to be used as a coating which is devoid of the foregoing disadvantages. Another object of the invention is to provide an improved addition product of an organic polyisocyanate and an organic compound having reactive hydrogen atoms which contains uretdione groups and is adapted for use as a binder in a lacquer powder. Still another object of the invention is to provide a polyaddition product of a polyisocyanate and an organic compound containing reactive hydrogen which can be converted into a powder below 50°C, has a softening or melting point between about 50°C and about 180°C and a hardening temperature of at least about 10°C to 40°C above the softening or melting point and can be used as a binder for a thermosetting powder lacquer.

The foregoing objects and others are accomplished in accordance with this invention, generally speaking, by providing a process for making a branched polyisocyanate polyaddition product having a molecular weight of about 464 to about 18,000 which is stable in storage and suitable for use as a binder for powder lacquers which set at temperatures above 110°C, the polyaddition product being produced by reacting an organic polyisocyanate which contains a uretdione group or a mixture of such a polyisocyanate with an organic polyisocyanate which is free from uretdione groups with a compound which contains hydrogen atoms capable of reacting with isocyanate groups, characterized in that a. the functionality of the reactants taking part in the polyaddition reaction and the proportions in which the reactants are used are chosen so that the average functionality of the resulting product of the process, based on the terminal reactive groups present in the product, is between about 2.05 and about 10,
b. the components taking part in the reaction are used in quantities corresponding to an equivalent ratio of groups capable of reacting with isocyanate groups to isocyanato groups of between about 1.07:1 and about 2.5:1, and
c. the polyisocyanate which contains a uretdione group is used in such quantities that the product of the process contains about 0.6 percent to about 25 percent by weight of uretdione groups —N=λ(CO)$_2$=N.

The invention also provides polyisocyanate polyaddition products obtained by this process.

Moreover, the invention provides a polyisocyanate polyaddition binder for thermosetting powder lacquers and lacquers containing the binder.

It has now been found in accordance with this invention that when preparing uretdione polyisocyanates capable of satisfying the conditions indicated above, special attention must be paid to the following features:

1. The average molecular weight of the uretdione polyisocyanate must be within a range of about 464 to about 18,000 and is preferably between about 520 and about 6000. The average molecular weight can easily be adjusted either by the molecular weight of the starting compounds used or by suitable choice of the equivalent ratio of groups capable of reacting with isocyanate groups to isocyanate groups in accordance with a simple, well-known stoichiometric calculation.

2. The quantity of uretdione groups

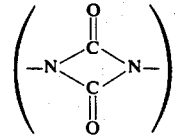

contained in the isocyanate polyaddition products must lie within the range of about 0.6 percent to about 25 percent by weight, preferably between about 2 and about 24 percent by weight. This concentration of uretdione groups in the product of the process can be calculated stoichiometrically and adjusted both by the concentration of uretdione polyisocyanate in the whole polyisocyanate component and by the molecular weight of the starting components as well as by the equivalent ratio of groups capable of reacting with isocyanato groups to isocyanato groups.

3. The products of the process must have a degree of branching which corresponds to an average functionality of the reactive end groups in the finished binder of about 2.05 to 10, preferably about 2.1 to 5. This functionality refers to the number of end groups which are capable of reacting with uretdione groups, for example, the hydroxyl, amino, carboxyl or sulphhydryl groups present in the products of the process. The primary amino group should be regarded for this purpose as a monofunctional group. The average functionality can easily be calculated from experimentally determined analytical data in accordance with the formula $$F_m = \frac{\overline{M} \times C}{100 \times E}$$

where
$\overline{M}$ = average molecular weight (osmotically determined)
$C$ = concentration of functional groups in percent by weight (OH— or NH$_2$— or COOH— groups), and
$E$ = equivalent weight of the functional group.

The required degree of branching can be obtained by using polyisocyanates having more than two —NCO groups and/or by adding compounds which contain more than two groups capable of reacting with isocyanate groups and which are, therefore, higher than difunctional for the purpose of the isocyanate polyaddition reaction.

In cases where the products obtained by the process according to the invention contain more than one kind of functional end group, e.g. hydroxyl, amino and/or carboxyl groups, the average functionality of the binder is calculated from the sum of the individual values of the average functionalities according to the formula
$F = F_m (OH) + F_m (NH_2) + F_m (COOH)$ The average functionality of the end groups with regard to those functional groups which are in end positions, this means particularly with regard to their terminal hydroxyl, amino and/or carboxyl groups, may be chosen to have surprisingly high values without thereby causing premature cross-linking reactions. In the case of products having a molecular weight of about 2500 to about 3500, it is quite suitable to adjust the average functionality to about 9. Preferred products of the process have an average molecular weight of about 1100 to about 6000 and an average functionality with regard to the functional end groups of 2.1 to 4.5 and most preferably an average molecular weight of 1100 to 3000 and a functionality of 3.8 to 4.5 but products with an average molecular weight of about 8000 to about 18,000 are also suitable for use as binders for powder lacquers. These binders with a higher molecular weight preferably have average functionalities of about 2.05 to about 2.14. The products can easily be adjusted to the desired average functionality by adding more highly functional starting compounds, i.e. organic polyisocyanates with a functionality greater than two and/or compounds which contain groups capable of reacting with isocyanate groups and have a functionality greater than two. Those reactants which have a branching effect are preferably used in the process according to the invention in proportions of about 5 to about 70 mol percent, based on the sum of all the compounds which take part in the isocyanate polyaddition reaction.

Any suitable compound containing a uretdione group may be used in practicing the invention such as, for example, those represented by the following general formula

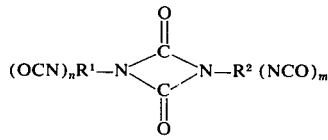

in which
n and m may be identical or different and represent integers of from 1 to 3, preferably 1, and
R$^1$ and R$^2$ represent identical or different (n+1)-valent or (m+1)-valent C$_2$–C$_{20}$ alkyl, C$_2$–C$_{20}$ alkenyl, C$_5$–C$_{15}$ cycloalkyl, C$_7$–C$_{15}$ aralkyl or C$_6$–C$_{15}$ aryl groups which may be interrupted or substituted with groups which contain oxygen, nitrogen or sulphur, or which may be substituted with halogen atoms.

The polyisocyanates with uretdione groups of the above general formula used for the process according to the invention are preferably those in which n and m both represent the integer 1 and in which R$^1$ and R$^2$ both represent hydrocarbon groups.

The following are examples of polyisocyanates containing a uretdione group which are especially suitable for use in the process of the invention: N,N'-bis-(5-isocyanato-1,3,3-trimethyl-cyclohexylmethyl)-uretdione; N,N'-bis-(6-isocyanato-n-hexyl)-uretdione; N,N'-bis-(6-isocyanato-5,5,3-trimethyl-hexyl)uretdione; N,N'-bis-(6-isocyanato-3,3,5-trimethyl-hexyl)-uretdione; N,N'-bis-(4-methyl-3-isocyanatophenyl)-uretdione; N,N'-bis-[4-(4-isocyanatophenyl-methyl)-phenyl]-uretdione, and the like. In principle, any polyisocyanate containing a uretdione group which can be prepared by a known process of dimerising the known polyisocyanates of polyurethane chemistry (e.g. German Offenlegungsschrift Nos. 1,670,720 and 1,934,763) may be used for the process according to the invention.

If desired, the polyisocyanate which contains a uretdione group may be used in the process according to the invention in combination with an organic polyisocyanate which is free from uretdione groups. Any suitable organic polyisocyanate which is free from uretdione groups may be used. For example, an organic polyisocyanate having the following general formula may be used for making the polyisocyanate which contains a uretdione group and/or it may be used as the polyisocyanate which does not contain a uretdione group:

R¹(NCO)ₙ₊₁ in which R¹ and n have the meanings already indicated above. The following are typical examples of suitable polyisocyanates: tetramethylene-1,4-diisocyanate, pentamethylene-1,5-diisocyanate, hexamethylene-1,6-diisocyanate, 2,2,4- and 2,4,4-trimethyl-1,6-diisocyanato-hexane, undecamethylene-1,11-diisocyanate, dodecamethylene-1,12-diisocyanate, 1,2-diisocyanatomethyl cyclobutane, 1,4-diisocyanatocyclohexane, dicyclohexyl diisocyanate, dicyclohexyl methane-4,4'-diisocyanate, p- and m-xylylene diisocyanate, 1-methyl-2,4-diisocyanatocyclohexane, 1-methyl-2,6-diisocyanatocyclohexane, 3-isocyanatomethyl-3,5,5-trimethyl-cyclohexyl isocyanate (= isophorone diisocyanate), α,ω-diisocyanatocaproic acid esters which contain 1 to 8 C-atoms in the alcohol residue, tolylene-2,4-diisocyanate, tolylene-2,6-diisocyanate, diphenyl 4,4'-diisocyanate, optionally substituted diisocyanatodiphenyl methane and higher homologs, naphthylene-1,5-diisocyanate, di-(4-isocyanatophenyl)-oxide, di-(4-isocyanatophenyl)-sulphide, 2-trichloromethyl-4,6-diisocyanato-s-triazine, triphenylmethane-4,4',4''-triisocyanate, perchlorinated aryl polyisocyanates, e.g. those described in German Auslegeschrift No. 1,157,601, polyisocyanates which contain carbodiimide groups as described in German Patent Specification No. 1,092,007, the diisocyanates described in U.S. Pat. No. 3,492,330, polyisocyanates which contain allophanate groups as described e.g. in British Patent Specification No. 994,890, Belgian Patent Specification No. 761,626 and published Dutch Patent Application No. 7,102,524, polyisocyanates which contain isocyanurate groups as described e.g. in German Patent Specification Nos. 1,022,789; 1,222,067 and 1,027,394 and in German Offenlegungsschrift Nos. 1,929,034 and 2,004,048, polyisocyanates which contain urethane groups as described e.g. in Belgian Patent Specification No. 752,261 or in U.S. Pat. No. 3,394,164, polyisocyanates which contain acylated urea groups according to German Patent Specification No. 1,230,778, polyisocyanates which contain biuret groups as described e.g. in German Patent Specification No. 1,101,394, in British Patent Specification No. 889,050 and in French Patent Specification No. 7,017,514, polyisocyanates which are prepared by telomerization reactions as described e.g. in Belgian Patent Specification No. 723,640, polyisocyanates which contain ester groups as described e.g. in British Patent Specification Nos. 956,474 and 1,072,956 in U.S. Pat. No. 3,567,763 and in German Patent Specification No. 1,231,688 and reaction products of the above mentioned isocyanates with acetals in accordance with German Specification No. 1,072,385.

The distillation residues from the commercial production of isocyanates, which still contain isocyanate groups, may also be used, if desired in the form of solutions in one or more of the abovementioned polyisocyanates. Any mixtures of the abovementioned polyisocyanates may also be used. If desired, small quantities (1 to 15 percent by weight, based on the end product) of monoisocyanates such as methyl isocyanate, ethyl isocyanate, methoxymethyl isocyanate, stearyl isocyanate, cyclohexyl isocyanate, phenyl isocyanate, methoxymethyl isocyanate or unsaturated isocyanates such as β-isocyanatoethyl methacrylate may be added.

The following are among the preferred isocyanates: hexamethylene diisocyanate, 3,3,5-trimethyl-5-isocyanato-methylcyclohexyl isocyanate, 2,4-diisocyanatotoluene, 2,6-diisocyanatotoluene, 4,4'-diisocyanatodiphenylmethane and 1,5-diisocyanatonaphthalene.

Suitable organic polyisocyanates for making the dimers and for use along with dimers are disclosed by Saunders and Frisch in the book "Polyurethanes: Chemistry and Technology" published by Interscience Publishers, copyright 1962 by John Wiley and Sons, Inc., the disclosure of which is incorporated herein by reference.

The total polyisocyanate component used in the process of the invention generally contains from 20 to 100 mol percent, preferably 50 to 100 mol percent of those polyisocyanates which contain a uretdione group.

The compounds with which the polyisocyanates are reacted in the process according to the invention may be any organic compound known in polyurethane chemistry having a molecular weight range from about 42 to about 8500, preferably about 62 to about 3500, which contains groups capable of reacting with isocyanate groups. Suitable reactants for the isocyanate component used in the process according to the invention include any organic compound within the given molecular weight range which contains free groups capable of reacting with isocyanate groups e.g. hydroxyl, amino, carboxyl or mercapto groups. Compounds which contain free hydroxyl and/or amino groups are preferred for the process of the invention.

The following are examples of compounds suitable for reaction with the polyisocyanate component to prepare the polyaddition product of the invention:

1. Organic polyols having a molecular weight below about 250, e.g. ethylene glycol, propane-1,3-diol, propane-1,2-diol, tetramethylene glycol, hexamethylene glycol, octamethylene glycol, glycerol, trimethylolpropane, pentaerythritol and other polyhydric alcohols.

2. Amino alcohols having a molecular weight below about 250 such as ethanolamine, diethanolamine, triethanolamine and 3-amino-propanol-trispropanolamine, and the like.

3. Polyamines having a molecular weight below about 250 e.g. ethylenediamine, trimethylenediamine, tetramethylenediamine, hexamethylenediamine, 3-aminomethyl-3,5,5-trimethyl-cyclohexylamine (= isophorone diamine), 1,4-diaminobenzene 2,4-diaminotoluene, 2,6-diaminotoluene and 4,4'-diaminodiphenylmethane and the like.

4. Polyesters which contain free hydroxyl groups and have molecular weights within the range of about 250 to about 8500 preferably about 600 to about 3500, such as, for example, those which can be obtained in known manner by reacting excess quantities of a polyol such as the ones listed as examples above with polycarboxylic acids, in particular with dicarboxylic acids, such as succinic acid, adipic acid, suberic acid, azelaic acid, sebacic acid, phthalic acid, isophthalic acid, tetrahydrophthalic acid, hexahydrophthalic acid, tetrachlorophthalic acid, maleic acid, fumaric acid or dimeric or trimeric unsaturated fatty acids. Instead of using free acids for the preparation of the polyesters, acid anhydrides such as phthalic acid anhydride, tetrahydrophthalic acid anhydride, hexahydrophthalic acid anhydride or maleic acid anhydride, etc. may be used. The average functionality of the polyester polyols can easily be calculated from their free hydroxyl group content and their osmotically determined molecular weight.

5. Polyethers which contain free hydroxyl groups and have a molecular weight in the range of about 250 to about 8500 preferably about 600 to about 3500 may be used such as, for example, those which can be obtained in known manner by alkoxylating suitable starter molecules such as water, the above mentioned polyols, amino alcohols or polyamines with alkylene oxides such as ethylene oxide, propylene oxide, styrene oxide, tetrahydrofuran or epichlorohydrin and the like. Polyethers which have been modified with vinyl polymers are also suitable for the process according to the invention, e.g. the compounds obtained by polymerizing styrene or acrylonitrile in the presence of polyethers (U.S. Pat. Nos. 3,383,351; 3,304,273; 3,523,093 and 3,110,695 and German Patent Specification No. 1,152,536).

In addition to the compounds given as examples above which contain groups capable of reacting with isocyanate groups, there may also be used, for example, any of the compounds containing reactive hydrogen atoms known per se in polyurethane chemistry for reaction with polyisocyanates such as polythioethers, polyacetals, polycarbonates, polyepoxides, polyester amides or polyurethanes which have molecular weights in the range of about 250 to about 8500, preferably about 600 to about 3500, and contain groups capable of reacting with isocyanate groups, preferably hydroxyl groups.

Other examples of compounds suitable for use in the process provided by the invention are, for example, copolymers of olefinic monomers which at least in part contain reactive groups capable of reacting with isocyanate groups, i.e. copolymers of, for example, styrene, butadiene, acrylonitrile, acrylic and/or methacrylic acid, alkyl esters, vinyl acetate, vinyl chloride and/or vinylidene chloride with acrylic acid, methacrylic acid, maleic acid and $\beta$-hydroxy-alkyl esters of methacrylic acid and of acrylic acid and the like.

In addition to the above mentioned compounds which are polyfunctional for the purpose of the polyisocyanate polyaddition reaction, compounds which are monofunctional in the the isocyanate polyaddition reaction may also be used in the process of the invention, preferably in proportions of 0 to 20 mols percent, based on the total quantity of components used in the process of the invention. These monofunctional compounds may be, for example, alkyl monoisocyanates such as hexyl isocyanate, stearyl isocyanate, aryl isocyanates such as phenyl isocyanate, $\alpha$-isocyanatonaphthalene or monofunctional alcohols such as methanol, ethanol or stearyl alcohol.

When mainly difunctional components are used, the increase in average functionality of the binders is preferably achieved by adding 5 to 50 mols percent of glycerol, trimethylolpropane or their alkoxylation products or ethoxylated or propoxylated pentaerythritol, based on the sum of all the starting compounds which are capable of polyaddition.

The process according to the invention is thus carried out using polyisocyanates which contain a uretdione group or mixtures of such polyisocyanates with polyisocyanates which are free from uretdione groups and the compounds, of which examples have been given above, which contain groups capable of reacting with isocyanate groups, or mixtures of such compounds. Other suitable compounds containing reacting hydrogen atoms determinable by the Zerewitinoff method and suitable for reaction with a polyisocyanate containing uretdione groups to make the polyaddition product contemplated by this invention are described in the above described Saunders and Frisch book.

When carrying out the process according to the invention, care must be taken to observe the correct equivalent proportion between the reactive hydrogen groups which are capable of reacting with isocyanate groups and the isocyanate groups. This proportion should be between about 1.07:1 and about 2.5:1 and is preferably between about 1.16:1 and about 2:1, the average molecular weights and concentration of the end groups of the polyaddition product being thereby controlled. The quantity of polyisocyanates with uretdione group used in the process according to the invention should be from about 5 to about 55 mol percent, preferably about 8 to about 45 mol percent, based on the sum of all reactants used in the process according to the invention. Moreover, the above mentioned parameters should be suitably chosen so that the quantity of uretdione groups present in the product of the process will be about 0.6 to about 25 percent by weight, preferably about 2 to about 24 percent by weight.

The process according to the invention may be carried out either in solution or solvent-free in the presence or absence of catalysts and at any suitable temperature such as from 0°C to 150°C, preferably about 15°C to about 120°C.

Any suitable solvent which is inert towards isocyanates and prepolymers which contain isocyanate groups and inert towards the Zerewitinoff active groups used for the reaction, such as for example, benzene, toluene, xylene, chlorobenzene, dichlorbenzene ethyl acetate, butyl acetate, methyl glycol ether acetate and ethyl glycol ether acetate and the like and, in some cases also acetone, cyclohexanone methyl ethyl ketone, dimethylformamide and the like.

The reaction may be carried out in the presence of one or more of any suitable catalyst which accelerates the isocyanate polyaddition reaction, preferably tertiary amines such as triethylamine, pyridine, methyl pyridine, N,N-dimethyl benzylamine, N,N-dimethylaminocyclohexane, N,N'-dimethylpiperazine, N,N'-endoethylene piperazine, amidines such as 1,5-diazabicyclo-(0.4.5)-undecene-(5) or metal salts such as iron (III)-chloride, zinc chloride, tin (II)-2- ethylcaproate, dibutyl tin (IV)-dilaurate, molybdenum glycolate, zinc-2-ethyl caproate and the like.

According to one particular method of carrying out the process of the invention, the polyisocyanate which contains a uretdione group is first converted into the corresponding polyol which contains a uretdione group by reacting it with an excess quantity of a diol of the type of which examples are given under (1) above, and this polyol is then reacted with additional quantities of a polyisocyanate which contains uretdione groups and/or polyisocyanate which is free from uretdione groups and with a compound containing groups which are reactive with isocyanate groups to produce the end product. When this method is employed, it is advantageous to react a diisocyanate which contains a uretdione group with a diol to produce the corresponding diol which contains a uretdione group, and this uretdione diol is then used as a chain-lengthening agent which is reacted with higher molecular weight —NCO prepolymers of the kind which can be obtained, for example, by reacting the polyesters of polyethers of the kind mentioned under (4) and (5) with excess polyisocyanate.

The products according to the invention have softening or melting points of 50° to 180°C, generally 60° to 120°C. In addition, the products can be used under conditions of stoving at 90° to 300°C, preferably 120° to 230°C, alone or as mixtures with other compounds which contain Zerewitinoff active hydrogen atoms, for example compounds of the type mentioned under (1) to (5), to produce high-quality synthetic resins and in particular coating films.

It is surprising in view of the known instability of uretdione groups that the products of the process can be treated at 110°C for considerable lengths of time without uretdione ring opening occurring to any significant extent in spite of the presence of an excess of groups which are reactive with uretdione groups, and that the products obtained are stable in storage and do not undergo cross-linking even under conditions of extrusion and can be hardened to produce high-quality synthetic resins at only moderately elevated temperatures.

Before their application, the products according to the invention may be mixed in the usual manner with the known dyes, pigments, fillers, other resins, hardening catalysts and auxiliary agents such as levelling agents, UV-absorbents, matting agents, etc.

The following are some of the most important advantages achieved by this invention:

a. Reactive powders are made available which can be cross-linked under conditions of stoving without liberating blocking agents.

b. The coating of metal articles is substantially improved compared with that achieved with pulverulent coating agents which cannot be cross-linked. Polymers such as polyvinyl chloride, polyethylene, polyamides or ethylene vinyl acetate copolymers which are applied to the metal article and then melted to form a protective coating are not cross-linked and, therefore, have little resistance to chemicals and in many cases insufficient resistance to corrosion. They have a very low surface hardness and in their appearance, gloss and level flow, they do not meet the requirements of a lacquer coat. These disadvantages are obviated by the polyurethane powders according to the invention which contain uretidone groups.

c. Significant advantages are achieved also compared with the lacquering of metal surfaces achieved with pulverulent polyepoxides which contain a reactive compound such as dicyandiamide, boron trifluoride derivatives or carboxylic acid anhydride as cross-linking agent. Although coatings produced with epoxides have advantageous technical properties as lacquers, they are not suitable for application outdoors because they are not resistant to light and weathering. Under the action of UV-light such lacquer coats rapidly lose their gloss and suffer from chalking. Polyurethanes which contain uretdione groups according to the invention, especially those based on dimeric hexamethylene diisocyanate and dimeric 3-isocyanatomethyl-3,5,5-trimethyl-cyclohexyl isocyanate (isophorone diisocyanate) have excellent light fastness and high resistance to weathering.

d. The products of the process can be adjusted advantageously to have such a low softening point that the powder can be pigmented in a heated mixing screw without undergoing cross-linking. Moreover, when the pulverulent binder, with or without pigment, has been applied to the article which is required to be lacquered and is then heat-treated, it is capable of melting to form a coating with an even flow and it is only after this stage that the coating undergoes complete cross-linking. On the other hand, the softening point of the binder may also be adjusted to be sufficiently high so that the binder, with or without pigment, can be ground up into a free-flowing powder with a particle size of about 20 microns to 120 microns which will not form lumps. In the case of two-component systems, the softening point of the binder and the degree of cross-linking and hardness of the hardened lacquer can be adjusted particularly easily by suitable choice and concentration of the second component, (preferably branched pulverulent hydroxy polyester).

The products of the process may be either single-component reactive resins, or particularly the higher molecular weight polyaddition products which contain uretdione groups, they may constitute multi-component reactive resins after the addition of low-molecular weight pulverulent triols, triamides or biurets, etc. If desired, they may be homogenized with pigments, levelling agents, plasticizers, fillers, catalysts and other auxiliary agents for lacquers at temperatures above their softening point. The reactive resin homogenized with these additives is then ground to the required particle size and sieved. The binders according to the invention may, of course, also be used as clear lacquers without pigments or they may be dissolved with solvents before use and used e.g. for wire lacquering and as electric insulating materials.

The powder resin may be applied by means of spray guns operated with compressed air on the particles may be sprayed electrostatically. The coating is then hardened on the article to which it has been applied by heating to temperatures above about 130°C. Alternatively, the article may be heated to temperatures above 130°C, e.g. to 250°C and then coated with the powder resin in a fluidized bed.

Various kinds of coatings may be obtained with the binders according to the invention, e.g. high gloss, semi-gloss and mat lacquer coatings and films, foils, and impregnations. They are suitable for coating metals, synthetic resins and textiles. For example, these coatings may be used to paint automobiles. They may be used as fleece binders, sizes e.g. for enveloping shaped products.

The invention will now be explained in more detail with the aid of the following examples. The parts given are parts by weight unless otherwise indicated. The molecular weights were determined osmotically.

EXAMPLES

EXAMPLE 1 a. 53.7 parts of branched polyester with an average molecular weight of 1600 obtained from adipic acid, phthalic acid (molar ratio = 1 : 2), propane-1,2,-diol and trimethylolpropane having an OH-number of 165 and an average functionality of 4.9 and 50.15 parts of trimethylolpropane are mixed at 40°C, with exclusion of moisture, with the product obtained by reacting 12 parts of 2-ethyl hexane-1,3-diol with 66.3 parts of a mixture of 80 parts of tolylene-2,4-diisocyanate and 20 parts of tolylene-2,6-diisocyanate at the same temperature. The temperature is slowly raised and the reaction mixture is then stirred at 110°C for 40 minutes. No free NCO groups are left by the end of that time. 17.4 parts of a uretdione diisocyanate which has been synthesized from 2 molecules of tolylene diisocyanate and contains 24.0% of free isocyanate groups are then stirred into this mixture at the same temperature and stirring is continued at that temperature until no more free isocyanate can be detected (30 minutes). After cooling of the reaction mixture, a springy hard, almost colorless resin is obtained which melts at about 105°C.

| | |
|---|---|
| Average OH-functionality of the binder: | 8.97 |
| Average molecular weight of the reaction product: | 3100 |
| Quantity of uretidone groups contained in the binder: | 2.12% by weight |
| Hydroxyl content of the binder: 4.9% by weight. | | b. 300 parts of the resin obtained according to (a) are sized-reduced and mixed with 150 parts of titanium dioxide (Rutile type) in an extruder at 115°C for 1 minute. The solidified, pigmented melt is size-reduced, ground and freed from particles with a diameter of more than 80 $\mu$ by screening. The screened particles are applied to degreased samples of sheet metal by the electrostatic powder spraying process under a voltage of 50 kilovolt, and when the sheets are stoved for 30 minutes at 120°C after application of the powder, they are found to be covered with a very hard, cross-linked film.

c. The resin prepared according to (a) is dissolved in acetone to form a 30% solution which is then painted on samples of sheet steel. After evaporation of the solvent at room temperature, the sheets were stoved at 140°C for 30 minutes. A high gloss, colorless very hard film with moderate elasticity was obtained.

EXAMPLE 2 a. 32.6 parts of tolylene diisocyanate (80%, 2,4-isomer), 34.8 parts of a linear polyester of adipic acid and butanediol with OH-number approximately 50 and an average molecular weight of 2240 and 2.6 parts of dimethyl propane-2,2-diol are mixed at room temperature with the exclusion of moisture and heated to 70°C for 2 hours. A clear, yellow liquid with an NCO-content of 16.9% is obtained. This liquid becomes waxy when stored for 2 days.

b. The product obtained according to (a) and 3.53 parts of trimethylolpropane and 18.1 parts of dimethylpropane-2,2-diol are together heated to 80°C for 45 minutes and then to 110°C for 45 minutes. No free isocyanate can be detected at the end of this time. After the addition of 14 parts of the uretdione diisocyanate obtained by dimerizing two molecules of tolylene diisocyanate, the melt is kept at a temperature of 110°C for 30 minutes. After cooling, the resin is springy hard and melts at about 95°C.

| | |
|---|---|
| Average OH-functionality of the binder: | 2.22 |
| Average molecular weight of the reaction product: | 4900 |
| Content of uretdione groups in the binder: | 3.22% by weight |
| Hydroxyl content of the binder: | 0.77% by weight | c. Resin (b) applied either as a powder or as an acetone solution can be cross-linked within 60 minutes at 160°C to form a level, high gloss, elastic, hard film.

d. 10 parts of resin (b) and 0.33 parts of a branched polyester of phthalic acid and trimethylolpropane containing approximately 8% of free hydroxyl groups are mixed as a solvent-free melt at 120°C and converted into a powder after cooling. The powder sprayed on sample sheets of metal gives rise to high gloss films when stoved at 160°C for 30 minutes.

EXAMPLE 3 a. 92.6 parts of tolylene diisocyanate (80% 2,4-isomer), 115 parts of polypropylene glycol (OH-content 3.4%) and 1.29 parts of water are stirred at 70°C for 2 hours, during which time the free isocyanate group content drops to 14%.

b. The product obtained according to (a) and 13.75 parts of trimethylolpropane and 38.2 parts of dimethyl propane-2,2-diol are together heated to 80°C for 45 minutes and to 110°C for 1 hour. 26.33 parts of the uretdione diisocyanate obtained from two molecules of tolylene diisocyanate are then stirred in and the reaction mixture is kept at 110°C for a further 30 minutes. The resin obtained is hard at room temperature and melts at about 96°C. When it is stoved at 160°C for 30 minutes, it gives rise to a high gloss, elastic synthetic resin.

| | |
|---|---|
| Average molecular weight of binder: | 3,820 |
| Average OH-functionality of binder: | 2.48 |
| Uretdione group content of the binder: | 2.21% by weight |
| Hydroxyl group content of the binder: | 1.1% by weight |

EXAMPLE 4

0.61 parts of N-methyl-diethanolamine, 49.4 parts of the polypropylene glycol described in Example 3, 0.55 parts of water and 38.96 parts of tolylene diisocyanate (80% 2,4-isomer) are heated to 60°C for 2 hours. 3.53 parts of trimethylolpropane 17.5 parts of dimethylpropane-2,2-diol dissolved in 10 parts by volume of ethyl acetate, and 0.31 parts of glacial acetic acid are then added and the reaction mixture is stirred at 80°C for 2 hours. The reaction mixture is then heated to 110°C for 15 minutes together with 11.22 parts of the uretdione diisocyanate obtained from 2 molecules of tolylene diisocyanate and then kept under a water jet vacuum for 25 minutes at this temperature. A resin which melts at about 84°C is obtained. When this is stoved at 160°C for 30 minutes (or longer in the case of thicker layers), elastic, hard, glossy cross-linked synthetic resins are obtained.

| | |
|---|---|
| Average molecular weight of binder: | 4,300 |
| Average OH-functionality of binder: | 2.54 |
| Uretdione group content of the binder: | 2.23% by weight |

EXAMPLE 5

38.1 parts of tolylene diisocyante (80% 2,4-isomer), 31.1 parts of the polypropylene glycol described in Example 3, 2.0 parts of dimethylpropane-2,2-diol and 0.3 parts of water are stirred for 2 hours at 60° to 70°C. A clear liquid which has a medium viscosity at room temperature is obtained. It has an NCO content of 17.85%. After the addition of 26.85 parts of the polyester described in Example 1a), 17.6 parts of dimethylpropane-2,2-diol and 0.82 parts of 3,3,5-trimethyl-5-aminomethyl-cyclohexylamine, it is heated to 80°C for 85 minutes and to 110°C for 30 minutes. After reaction of this mixture with 11.22 parts of the uretdione diisocyanate of 2 molecules of tolylene diisocyanate at 110°C to 115°C for 20 minutes, a colorless resin which melts at 110°C and which can be cross-linked by stoving at 160°C for 30 minutes is obtained.

| | |
|---|---|
| Amount of hydroxyl compounds in the binder: | 1.0% by weight |
| Average molecular weight of binder: | 5,700 |
| Average OH-functionality of binder: | 2.17 |
| Uretdione group content of the binder: | 2.14% by weight |
| Hydroxyl group content of the binder: | 0.65% by weight |

EXAMPLE 6

20 parts of the branched polyester described in Example 1(a), 53.75 parts of a linear polyester of phthalic acid and ethylene glycol having an OH-number of 55 and 25 parts of a branched polyester of phthalic acid, trimethylolpropane, butane, 1,3-diol and 2,2-bis-(4-hydroxy-cyclohexyl)-propane with an OH number of 66 are freed from traces of moisture by heating to 120°C at 12 mm.Hg. After the addition of 0.05 parts of dibutyl tin-(IV)-dilaurate and 16.66 parts of a mixture prepared by the process described in German Offenlegungsschrift No. 1,934,763 from 3,3,5-trimethyl-5-isocyanatomethyl-cyclohexyl isocyanate, uretdione diisocyanate and triisocyanato-isocyanurate based on the same diisocyanate in proportions by weight of 1:3:6, the reaction mixture is heated to 100°C for 1 hour and 80°C for 3 hours. No isocyanate groups can be detected after this time. When the product is sprayed as a powder on a sample of sheet metal and stoved at 160°C for 30 minutes, a clear, high-gloss, elastic, crosslinked film is obtained.

| | |
|---|---|
| Average molecular weight of binder: | 2,980 |
| Average OH-functionality of binder: | 2.11 |
| Uretdione group content of the binder: | 0.82% by weight |
| Hydroxyl group content of the binder: | 1.2% by weight |

EXAMPLE 7 a. 400 parts of a polyester of phthalic acid and ethylene glycol (OH-number 56) and 100 parts of a polyester of adipic acid and butylene-1,4-glycol (OH-number 55) which has an elasticizing action are first dehydrated in a water jet vacuum at 120°C for 0.5 hours. After the addition of 151 parts of a mixture of 43 parts of dimeric 3,3,5-trimethyl-5-isocyanatomethyl-cyclohexyl isocyanate (= dimeric isophorone diisocyanate), 11 parts of trimeric and 46 parts of monomeric 3,3,5-trimethyl-5-isocyanatomethyl-cyclohexyl isocyanate (NCO-content of the mixture: 27.7%), the whole reaction mixture is kept at 110°C for 10 minutes. 0.03 parts of the tin-(II)-salt of 2-ethylcaproic acid are then added. The temperature is kept at 112° to 118°C for 4 minutes. The resulting NCO prepolymer is then reacted with 29.6 parts of 2,2-dimethylpropane-1,3-diol and 4.48 parts of trimethylolpropane to produce a branched polyurethane which contains uretdione groups. After the addition of the chain-lengthening agent, the reaction is immediately poured into a metal cup which is then heated to 110°C for half an hour. OH/NCO equivalent ratio during polyaddition: 1.165 to 1. A springy hard, easily powdered polyurethane which contains uretdione groups is obtained.

| | |
|---|---|
| Softening point of the binder: | 94°–101°C |
| Average molecular weight of the binder: | 9,090 |
| Average OH-functionality of the binder: | 2.14 |
| Uretdione group content of the binder: | 1.82% by weight |
| Hydroxyl group content of the binder: | 0.40% by weight | b. 100 parts of the self cross-linking polyester resin obtained according to Example 7(a) are mixed with 20 parts of titanium dioxide/Rutil in a two-armed mixer and the mixture is then melted in a heated two-shaft kneading screw for 20 seconds. The temperature in the heating zone is 95°C. When the mass has solidified, it is size-reduced in a cross beater mill and then ground in a beater mill. Particles with a diameter above 80μ and those with a diameter below 40μ are removed by screening. The resulting powder obtained is easily pourable. It was applied to thoroughly degreased, derusted metal sheets by electrostatic spraying, using a commercial powder spraying apparatus. The particles are negatively charged, the voltage applied is 40 KV and the spray pressure is 0.8 excess atmospheres. After stoving at 170°C for 30 minutes, very hard and glossy and non-porous films are obtained with a thickness of about 165μ.

EXAMPLE 8 a. The polyaddition product with uretdione groups obtained according to Example 7(a) is used for preparing two-component systems with the addition of the polyester components described below.

b. 208 parts of 2,2-dimethylpropane-1,3-diol and 268 parts of 1,1,1-tris-hydroxymethylpropane are melted in a distillation apparatus with stirrer at 120° to 130°C. 444 parts of phthalic acid anhydride are introduced into the melt. The mixture is stirred under a nitrogen atmosphere at 140°C for 1 hour until a clear liquid is again obtained. 9 parts (1% by weight) of approximately 80% phosphorous acid are then added. A vigorous reaction sets in and water is split off. The temperature is raised and kept at 150°C for 2 to 3 hours with vigorous stirring. Heating is then continued for about 7 hours to a temperature of 220°C, the rate of heating being adjusted to the rate of distillation (the temperature registered by the distillation thermometer should remain at 100°C). Stirring is then continued for 1 hour at 220°C and the reaction mixture is then left to cool to 150°C. Esterification is finally continued under reduced pressure, using a water jet vacuum. The temperature is raised to 220°C in the course of 5 to 7 hours and stirring is continued for 1 hour at 220°C to complete the reaction. The acid number of the product is then approximately 1. The hot melt is poured out on to a metal sheet, and after cooling it is a brittle, glassy substance which can easily be size-reduced.

| | |
|---|---|
| Yield: | 95% |
| Hydroxyl number: | 206 |
| Acid number: | 1.1 | c. 1,000 parts of the highly reactive, self cross-linking solid polyester urethane resin obtained according to Example 7(a) and 100 parts of the polyester resin obtained according to (b) are mixed in a cross beater mill and reduced to a particle size of not more than 1 mm in diameter. The particles are then thoroughly mixed with 40 parts of titanium dioxide (Rutil) in a mixer (centrifuging and whirling system) and then melted in a heatable extruder screw. The time of stay in the extruder is 20 seconds, the temperature of the jacket 80°C and the outflow temperature 112°C. When the mass has solidified, it is coarsely size-reduced in a cross-beater mill and then ground in a beater mill. Particles above 80$\mu$ and those below 40$\mu$ in diameter are removed by screening. The resulting powder is easily pourable, i.e. its behavior resembles that of a liquid. It is sprayed electrostatically by means of a commercial powder spraying apparatus ("STAJET", of SAMES, Grenoble) at a voltage of 40 KV and delivery pressure of 0.8 excess atmosphere. The particles are negatively charged. The adherence to derusted and thoroughly degreased metal sheets if firm. After stoving at 160°C for 30 minutes, the thickness of the film is approximately 160 $\mu$. The surface is hard and elastic and well levelled. The lacquer films show no signs of yellowing after about 900 hours in the weathermometer test.

EXAMPLE 9

Polyesters are prepared from various acids and alcohols as in Example 8(b) and added to the urethione-containing polyadduct from Example 7(a) in proportions of 10% by weight as cross-linking component and to improve the fluidity. The resulting reactive resins consist of 1000 parts of the polyadduct with uretdione groups described in Example 7(a) and 100 parts of a polyester of a. 444 parts of phthalic acid, 108 parts of propane-1,2-diol, 59 parts of hexane-1,6-diol and 268 parts of trimethylolpropane with hydroxyl content 4.7% and acid number 3.9.

b. 488 parts of benzoic acid, 592 parts of phthalic acid anhydride, 236 parts of hexane-1,6-diol and 408 parts of pentaerythritol with a hydroxyl content of 4.2% and an acid number of 1.9.

c. 470 parts of 3,4-dichlorphthalic acid, 166 parts of isophthalic acid, 118 parts of hexane-1,6-diol and 402 parts of trimethylolpropane with a hydroxyl content of 7.1% and an acid number of 2.8.

d. 462 parts of hexahydrophthalic acid anhydride, 68 parts of propane-1,2-diol, 12 parts of hexane-1,6-diol and 402 parts of trimethylolpropane.

e. 308 parts of hexahydrophthalic acid anhydride, 166 parts of isophthalic acid, 76 parts of propane-1,2-diol, 33 parts of hexane-1,6-diol and 375 parts of trimethylolpropane with a hydroxyl content of 6.6% and an acid number of 2.0.

f. 462 parts of hexahydrophthalic acid anhydride, 152 parts of propane-1,2-diol and 268 parts of trimethylolpropane with a hydroxyl content of 4.8% and an acid number of 1.5.

g. 296 parts of phthalic acid anhydride, 332 parts of isophthalic acid, 402 parts of trimethylolpropane and 208 parts of 2,2-dimethylpropane-1,3-diol with a hydroxyl content of 5.6% and an acid number of 1.9.

h. 592 parts of phthalic acid anhydride, 208 parts of 2,2-dimethylpropane-1,3-diol and 402 parts of trimethylolpropane with a hydroxyl content of 5.6% and an acid number of 3.2.

i. 462 parts of hexahydrophthalic acid anhydride, 76 parts of propane-1,2-diol, 240 parts of 2,2-bis-(4-hydroxycyclohexyl)-propane and 268 parts of trimethylolpropane with a hydroxyl content of 3.8% and an acid number of 1.3.

j. 462 parts of hexahydrophthalic acid anhydride, 104 parts of 2,2-dimethylpropane-1,3-diol, 240 parts of 2,2-bis-(4-hydroxy-cyclohexyl)-propane and 268 parts of trimethylolpropane with a hydroxyl content of 4.3% and an acid number of 3.2.

k. 462 parts of hexahydrophthalic acid anhydride, 59 parts of hexane-1,6-diol, 38 parts of propane-1,2-diol, 240 parts of 2,2-bis-(4-hydroxy-cyclohexyl)-propane and 268 parts of 1,1,1-trimethylolpropane with a hydroxyl content of 3.8% and an acid number of 2.1.

l. 444 parts of phthalic acid anhydride, 90 parts of butane-1,3-diol, 94 parts of hexane-1,6-diol, 228 parts of trimethylolpropane and 43 parts of ethanediol (hydroxy content 4.3%; acid number 2.7).

m. 444 parts of phthalic acid anhydride, 90 parts of butane-1,3-diol, 76 parts of propane-1,2-diol and 268 parts of trimethylolpropane (hydroxyl content 4.6%; acid number 2.7).

Preparation of the lacquer films from the pulverulent reactive resins is carried out in the same way as described in Example 8(c).

EXAMPLE 10

400 parts of a polyester of phthalic acid and ethylene glycol (OH-number 56), 100 parts of a polyester of adipic acid and butylene-1,4-glycol (OH-number 56) and 7 parts of trimethylolpropane are first dehydrated at 120°C for 0.5 hours. The temperature is then allowed to drop to 115°C and 87 parts of 1-methyl-benzene-2,4-diisocyanate are then added. After 20 minutes, 143.5 parts of pulverulent $\alpha$, $\omega$-dihydroxy-uretdione of the formula

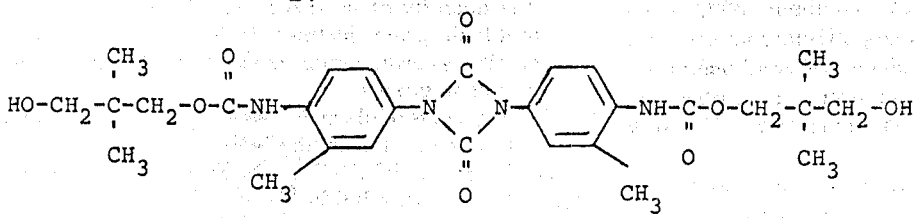

are added to the resulting highly fluid NCO prepolymer at 115°C. The mixture is immediately poured into a metal dish and polyaddition is then completed in a heating cupboard at 110°C in the course of 0.5 hours. After cooling, a springy hard, easily powdered resin is obtained which is suitable for the preparation of hard and glossy film coatings as described in Example 7(b).

| | |
|---|---|
| Average molecular weight of binder: | 8,800 |
| Average OH-functionality of binder: | 2.07 |
| Uretdione group content of the binder: | 2.92% by weight |
| Hydroxyl group content of the binder: | 0.4% by weight |

EXAMPLE 11

500 parts of a linear polyester of phthalic acid and ethylene glycol with OH-number 56 are dehydrated under vacuum (water pump) for half an hour at 130°C. The compound is then cooled to 110°C and 169.3 parts of a low viscosity polyisocyanate mixture which contains uretdione groups and which consists of 67% by weight of dimeric hexamethylene diisocyanate and 33% by weight of tris-isocyanatohexyl isocyanurate are added. The isocyanate content of this mixture is 24.92% by weight. The reaction mixture is then kept at 110°C for 25 minutes to terminate prepolymer formation. 67 parts of trimethylolpropane are then stirred in. The reaction mixture is poured out on to metal sheets and kept there at 110°C for 2 hours. A springy hard, easily powdered resin is obtained which is suitable for preparing hard, glossy, light fast films.

| | |
|---|---|
| Average molecular weight of binder: | 2,950 |
| Average OH-functionality of the binder: | 3.99 |
| Uretdione group content of binder: | 3.83% by weight |
| Hydroxyl group content of the binder: | 2.3% by weight |

If the trimethylolpropane indicated in the above example is replaced by
a. 0.5 mol of dimethylolpropionic acid,
b. 0.25 mol of ammonium carbonate, and 0.25 mol of trimethylolpropane,
c. 0.25 mol of adipic acid and 0.25 mol of trimethylolpropane or
d. 0.25 mol of the semiamide of maleic acid anhydride and ammonia and 0.25 mol of trimethylolpropane, easily powdered branched polyaddition products with built-in uretdione groups and with end groups capable of reacting with uretdione groups are obtained in each case.

EXAMPLE 12

This example demonstrates the preparation of binders according to the invention which have a branched structure and high uretdione group concentration and the possibility of freeing the binders according to the invention from traces of solvents adhering the them by treating them with water without the uretdione groups being thereby hydrolyzed.

62 parts by weight (= 1 mol) of ethylene glycol in 3000 parts by weight of dimethylformamide are reacted with 696 parts by weight of dimeric tolylene diisocyanate (80% 2,4-isomer) at 75°C in the presence of 0.3 parts by weight of the tin-II-salt of 2-ethylcaproic acid for 2 hours to product the NCO prepolymer. 268 parts by weight of melted trimethylolpropane are then added all at once to the resulting suspension and the reaction mixture is vigorously cooled to prevent the reaction temperature rising above 80°C. After termination of the exothermic reaction, stirring is continued for 2 hours at 75°C and the suspension is then left to cool under conditions of vigorous stirring. A finely divided powder is thereby formed. 8000 parts by weight of water is added to the dispersion at 20°C and the pulverulent polyaddition product is filtered. The reaction product is washed with a large quantity of water and then with acetone and freed from dimethylformamide adhering to it. After drying, a finely powdered polyaddition product is obtained which is subsequently crosslinked by stoving at 180°C for 15 minutes.

| | |
|---|---|
| Average molecular weight of binder: | 1,100 |
| Average OH-functionality of binder: | 4.27 |
| Uretdione group content of binder: | 24.2% by weight |
| Hydroxyl group content of binder: | 6.6% by weight |

Any of the other polyisocyanates containing a uretdione group, polyisocyanates free from uretdione groups, organic compounds containing reactive hydrogen atoms determinable by the Zerewitinoff method, solvents, catalyst and reaction conditions indicated as suitable herein may be substituted for those used in the foregoing examples for the purpose of illustration.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a branched polyurethane or polyurethane urea polyaddition product having free OH groups and a molecular weight in the range of 1100 to 3000 which is stable in storage and suitable for use as a binder for lacquer powders which set at temperatures above 110°C, can be converted into powders below 50°C and have a softening or melting point between about 50°C and about 180°C, which comprises reacting an organic polyisocyanate containing uretdione groups or a mixture of uretdione group-containing and uretdione group-free organic polyisocyanates with compounds containing free OH groups wherein a. the functionality of the reactants which take part in the polyaddition reaction and their proportions are so chosen that the average functionality of the products of the process, based on the reactive end groups in the products, is between about 3.8 and 4.5, b. the components which take part in the reaction are used in quantities corresponding to an equivalent ratio of hydroxyl groups:isocyanate groups of between about 1.07:1 and about 2.5:1, and c. the quantity of polyisocyanate which contains a uretdione group in the reaction mixture is sufficient to provide about 0.6% to 25% by weight of uretdione groups.

2. The process of claim 1 wherein the reaction is carried out at temperatures of about 0°C to 150°C.

3. The process of claim 2 wherein the reaction mixture contains a catalyst for the reaction between isocyanato groups and reactive hydrogen atoms.

4. The product of the process of claim 1.

5. The process of making a two-component composition which comprises combining the product of the process of claim 1 with from about 5% to about 45% by weight, based on the weight of said product, of a polyhydroxyl compound having a molecular weight of from about 400 to about 6,000.

* * * * *